US012689264B2

(12) United States Patent     (10) Patent No.:   US 12,689,264 B2

Cilluffo et al.     (45) Date of Patent:     Jul. 21, 2026

(54) POWER PRODUCING APPARATUSES AND METHODS OF USE

(71) Applicants: Barak Cilluffo, Redding, CA (US); Heather Cilluffo, Redding, CA (US)

(72) Inventors: Barak Cilluffo, Redding, CA (US); Heather Cilluffo, Redding, CA (US)

(73) Assignee: FLOWLOOPX, Redding, CA (US)

( * ) Notice: Subject to any disclaimer, the term of this patent is extended or adjusted under 35 U.S.C. 154(b) by 0 days.

(21) Appl. No.: 18/778,768

(22) Filed: Jul. 19, 2024

(65) Prior Publication Data

US 2025/0030315 A1     Jan. 23, 2025

Related U.S. Application Data

(60) Provisional application No. 63/528,215, filed on Jul. 21, 2023.

(51) Int. Cl.
H02K 7/18     (2006.01)

(52) U.S. Cl.
CPC .................................. *H02K 7/1823* (2013.01)

(58) Field of Classification Search
CPC ................................................... H02K 7/1823
See application file for complete search history.

(56) References Cited

U.S. PATENT DOCUMENTS

| | | | | |
|---|---|---|---|---|
| 4,250,415 A | * | 2/1981 | Lewiner | H04R 19/01 |
| | | | | 381/191 |
| 2016/0336505 A1 | * | 11/2016 | Arizumi | H10N 30/308 |
| 2019/0379300 A1 | * | 12/2019 | Cao | H10N 30/073 |

* cited by examiner

*Primary Examiner* — Joseph Ortega

(74) *Attorney, Agent, or Firm* — Lexigent LLC

(57) ABSTRACT

The present disclosure pertains to a device for capturing and converting kinetic energy into electrical energy. The device comprises a first substrate and a second substrate, with the second substrate covered by the first. The second substrate includes spaced-apart, semi-rigid plates. Positioned below the second substrate is a hose arranged in a serpentine configuration and filled with fluid, located directly underneath each plate. A third substrate is situated below the hose, forming part of the overall structure of the device.

18 Claims, 8 Drawing Sheets

POWER PRODUCING APPARATUSES AND METHODS OF USE

CROSS REFERENCE TO RELATED APPLICATIONS

This non-provisional application claims the benefit and priority of U.S. Provisional Application Ser. No. 63/528, 215, filed on Jul. 21, 2023, which is hereby incorporated herein in its entirety including all references and appendices cited therein.

FIELD

The present disclosure relates to the field of energy conversion technologies. Specifically, but not by way of limitation, this disclosure pertains to devices, methods, and systems designed for capturing kinetic energy from external sources, such as moving vehicles, and converting this kinetic energy into electrical energy. The present disclosure encompasses multi-layered structures, fluid dynamics, and mechanical-to-electrical energy conversion mechanisms aimed at optimizing the efficiency and practicality of energy harvesting in various applications.

SUMMARY

According to some embodiments, the present disclosure is directed to a device for capturing and converting kinetic energy into electrical energy. The device also includes a first substrate; a second substrate that is covered by the first substrate, the second substrate may include plates, where adjacent plates are spaced apart from one another, the plates each being semi-rigid; a hose positioned below the second substrate in a serpentine configuration such that the hose is located directly underneath each of the plates, the hose being filled with a fluid; and a third substrate located below the hose. Other embodiments of this aspect include corresponding computer systems, apparatus, and computer programs recorded on one or more computer storage devices, each configured to perform the actions of the methods.

Implementations may include one or more of the following features. The device may include a converter that is in closed-loop fluid communication with the hose, the converter being configured to create electrical energy as the hose is depressed by the plates causing the fluid to interact with the converter. The device may include a sink or a load for receiving the electrical energy. The converter is an electric motor and the fluid is configured to rotate a shaft that causes the electric motor to produce the electrical energy. The device may include a fourth substrate located between the second substrate and the hose. The device may include a first one-way valve located before a first plate of the plates. The device may include a second one-way valve located after a last plate of the plates. The device may include rails disposed on the first substrate to protect the plates and prevent a plow from contacting the plates. Implementations of the described techniques may include hardware, a method or process, or computer software on a computer-accessible medium.

One general aspect includes a method providing a device may include: a first substrate; a second substrate covered by the first substrate, the second substrate may include primary plates that are spaced apart and semi-rigid; a hose positioned below the second substrate in a serpentine configuration, directly underneath each of the primary plates, the hose being filled with a fluid; a converter in closed-loop fluid communication with the hose, configured to create electrical energy as the hose is depressed by the primary plates; a sink for receiving the electrical energy. The method also includes permitting a vehicle to drive over the device, where wheels of the vehicle contact and depress the plates in series, where a first plate is depressed before a last plate by the vehicle so that the fluid in the hose is sequentially propagated through the hose towards the converter, thereby providing continuous flow of the fluid to the converter as the vehicle traverses over the plates. Other embodiments of this aspect include corresponding computer systems, apparatus, and computer programs recorded on one or more computer storage devices, each configured to perform the actions of the methods.

Implementations may include one or more of the following features. The method may include providing a fourth substrate between the second substrate and the hose, installing a one-way valve before and after each primary plate, and rotating a shaft with the fluid to cause an electric motor to produce the electrical energy. Implementations of the described techniques may include hardware, a method or process, or computer software on a computer-accessible medium.

One general aspect includes a system for capturing and converting kinetic energy into electrical energy a first device may include: a first substrate; a second substrate that is covered by the first substrate, the second substrate may include plates, where adjacent plates are spaced apart from one another, the plates each being semi-rigid; a hose positioned below the second substrate in a serpentine configuration such that the hose is located directly underneath each of the plates, the hose being filled with a fluid; a third substrate located below the hose; a converter that is in closed-loop fluid communication with the hose, the converter being configured to create electrical energy as the hose is depressed by the plates causing the fluid to interact with the converter; a sink for receiving the electrical energy. The system also includes a first device support frame configured to support the first device above a subordinate surface; and a second device configured identically to the first device, where a hose of the second device is configured to extend through the first device support frame and connect to another converter that is co-located with the converter associated with the first device. Other embodiments of this aspect include corresponding computer systems, apparatus, and computer programs recorded on one or more computer storage devices, each configured to perform the actions of the methods.

Implementations may include one or more of the following features. The system may include angled ramps associated with terminal edges of the first device and the first device support frame. The system may include: a fourth substrate located between the second substrate and the hose; a first one-way valve located before a first plate of the plates; and a second one-way valve located after a last plate of the plates. The system may include: a hydro fan in combination with the converter; a first one-way valve located before the hydro fan; and a second one-way valve located after the hydro fan. The system may include rails disposed on the first substrate to protect the plates and prevent a plow from contacting the plates. The hose of the second device extends under plates of second device in an orientation that is perpendicular to the orientation of the hose of the first device. The hose of the second device extends under plates of second device in a parabolic arc. The hose of the second device extends under plates of second device at an angle relative to an angle of the plates. Implementations of the described techniques may include hardware, a method or process, or computer software on a computer-accessible medium.

DETAILED DESCRIPTION OF EXAMPLE EMBODIMENTS

Overview

Figure 1:
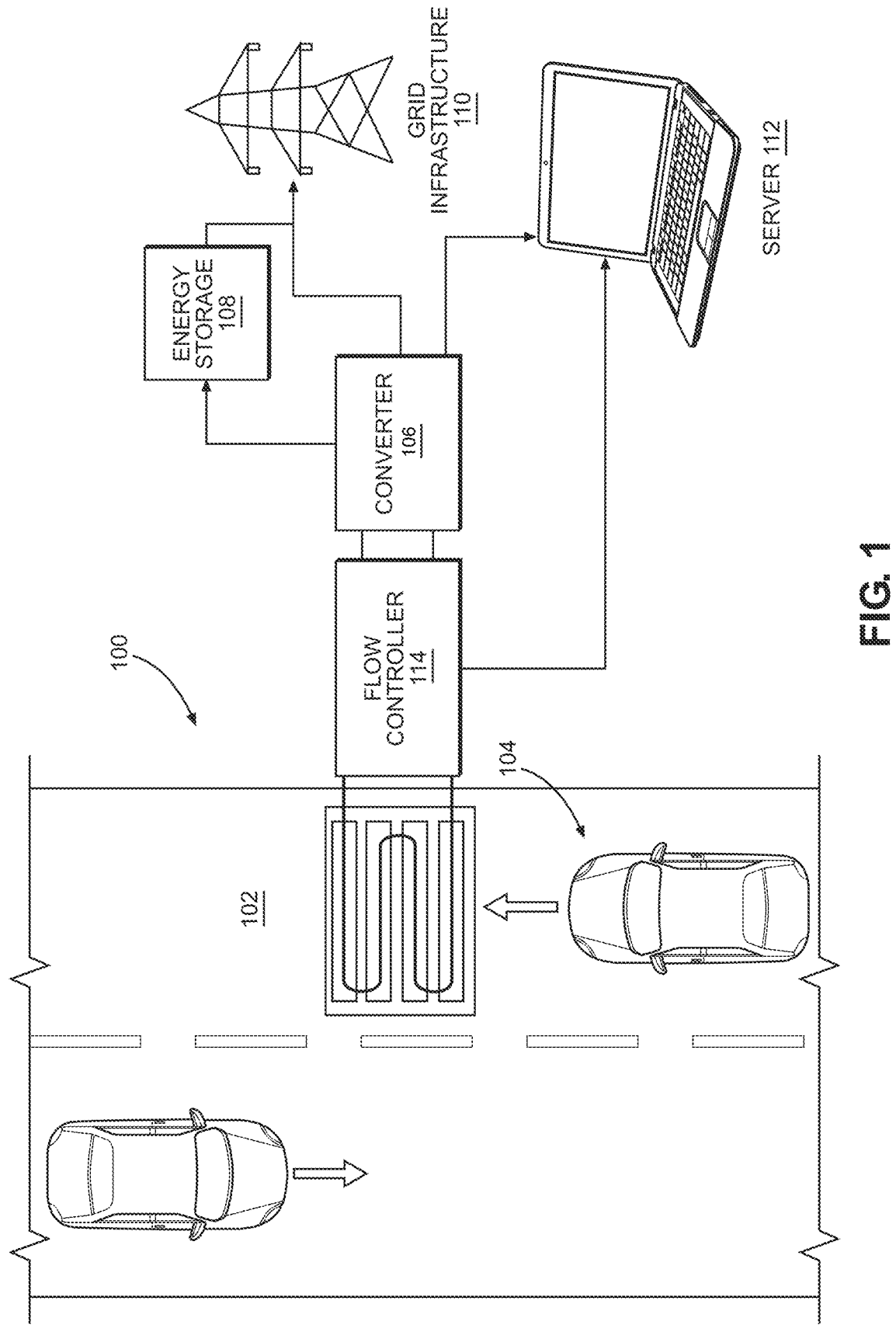
FIG. 1 illustrates an example device of the present disclosure for converting kinetic energy into electrical energy.

As noted above, the present disclosure pertains to devices, methods, and systems designed for capturing and converting kinetic energy into electrical energy. An example device is constructed with multiple layers to optimize its functionality. At the top of the device is a first substrate that serves as the initial contact layer. Beneath this lies a second substrate which is covered by the first substrate. This second substrate is composed of semi-rigid plates that are spaced apart from one another, allowing for flexibility and movement.

Positioned below the second substrate is a hose arranged in a serpentine configuration. This hose is filled with a fluid and is strategically placed directly underneath each of the plates. The serpentine arrangement of the hose ensures that as the plates are depressed, the fluid within the hose is sequentially pushed through the system. A third substrate is located beneath the hose, providing additional support and structure to the device.

A fourth substrate placed between the second substrate and the hose to add additional structural support. Additionally, one-way valves may be installed, which help to control the flow of fluid, ensuring that the fluid moves in a single direction and thereby optimizing the conversion of kinetic energy into electrical energy.

The system includes an energy converter such as an electric motor/generator. The converter is in closed-loop fluid communication with the hose and is configured to generate electrical energy as the hose is depressed by the plates. The interaction between the fluid and the converter is what facilitates the transformation of mechanical movement into electrical power. The converter can be an electric motor with a rotating shaft, or it can incorporate a more complex mechanism such as a piston, weight, and gear assembly. In the latter configuration, the fluid drives the piston to raise the weight, and the weight, in turn, causes the gear assembly to rotate due to gravitational force, thus turning a motor to produce electrical energy.

The method of utilizing a device as disclosed herein involves placing the device in locations where vehicles can drive over the device. As the wheels of a vehicle pass over the device, they sequentially depress the plates. This action causes the fluid in the hose to be sequentially propagated through the hose towards the converter. The continuous movement of fluid ensures a steady flow to the converter, enabling ongoing energy generation as vehicles continue to traverse the device. This method can be enhanced by adding features such as one-way valves before and after each plate to regulate the fluid flow.

This arrangement of the plates and the hose can create a sequential rocking effect or wave-like motion from one primary plate to another as they are sequentially depressed, further optimizing the energy conversion process.

The system designed for capturing and converting kinetic energy into electrical energy comprises multiple devices configured identically. Each device includes the aforementioned substrates, plates, and hose. These devices are supported by a device support frame, which elevates them above a subordinate surface. In the system, the hose of one device can extend through the support frame and connect to another converter that is co-located with the first device's converter, ensuring a seamless and efficient energy conversion process. The system may also feature angled ramps associated with the terminal edges of the devices and the support frame, facilitating the smooth passage of vehicles over the devices and enhancing the overall efficiency of energy capture and conversion.

Example Embodiments

FIG. 1 illustrates an example device 100 of the present disclosure for converting kinetic energy into electrical energy. The device 100 is comprised of a series of substrates arranged in a layered configuration, as will be discussed in greater detail infra.

The device 100 for capturing and converting kinetic energy into electrical energy can be effectively utilized in various locations where there is consistent movement of vehicles or other sources of kinetic energy. One prime location for such a device is roadways and highways. By embedding the device in the surface of roads and highways, the constant traffic flow can generate substantial amounts of kinetic energy. This energy can then be converted into electrical power to support roadway lighting, traffic signals, and other infrastructure needs, thereby reducing dependency on conventional power sources.

Another ideal location for this device is in parking lots, especially in commercial areas, shopping malls, and office complexes. The movement of vehicles entering and exiting the parking area provides a continuous source of kinetic energy. The generated electrical energy can be used to power security systems, lighting, and electric vehicle charging stations, enhancing the sustainability of these facilities.

Toll plazas and weigh stations also offer significant potential for this technology. These locations experience a high volume of vehicle stop-and-go movement, making them perfect candidates for the installation of the device. The energy captured from the frequent starts and stops of vehicles can be utilized to power the operations of the toll plaza or weigh station, including electronic toll collection systems, lighting, and communication equipment.

Additionally, the device can be used in urban settings, such as busy intersections and pedestrian crossings, where both vehicular and pedestrian traffic can be harnessed to generate energy. This energy can be fed back into the grid or used locally to power streetlights, traffic signals, and public charging stations. By integrating this device into various high-traffic areas, cities can improve their energy efficiency and sustainability.

In industrial and commercial transportation hubs, such as airports, seaports, and distribution centers, the device can capture energy from the constant movement of vehicles, luggage carts, and other equipment. This energy can be converted to support the electrical needs of these large facilities, contributing to overall energy savings and operational efficiency.

The device 100 can be placed onto various substrates 102, such as roadways, parking lots, and other surfaces with frequent vehicular traffic. When a vehicle 104 drives over the device 100, the ground engaging members (such as wheels) of the vehicle 104 contact the device 100. This interaction transfers kinetic energy to the device 100, which is then converted into electrical energy by the device 100. This conversion process harnesses the otherwise wasted kinetic energy from moving vehicles, providing a valuable source of renewable energy that can be used to power various infrastructure elements such as streetlights, traffic signals, and public charging stations.

A flow controller 114 can be positioned before the converter 106. The flow controller 114 plays a role in regulating the pressure and flow rate of the fluid as the fluid moves towards the converter 106. This ensures the converter 106 operates within optimal parameters, maximizing the efficiency of the energy conversion process and preventing damage to the device 100. While a single converter is shown, in some embodiments a plurality of converters can be coupled with the hose. An additional embodiment includes a configuration where multiple hoses, whether running perpendicular or parallel to the plates, feed into a main line. This main line then directs the fluid to a single or multiple generators. Each hose is equipped with a valve to regulate the ingress and egress of fluid into the main line.

The flow controller 114 can be controlled by a server 112, which is integrated into the overall smart control system of the device. The server 112 monitors real-time data from various sensors placed throughout the system, including those measuring fluid flow, pressure, and temperature. Based on this data, the server 112 can dynamically adjust the settings of the flow controller 114 to maintain consistent and optimal fluid conditions.

By regulating the pressure and flow rate with the flow controller 114, the system can prevent issues such as overpressure, which could damage components or reduce efficiency. This regulation ensures a steady and controlled flow of fluid to the converter 106, enhancing the overall performance and reliability of the device.

The integration of the flow controller 114 with the server 112 allows for advanced features such as predictive maintenance and automated adjustments based on environmental conditions or changes in vehicle traffic patterns. This smart control capability not only improves the efficiency of the kinetic energy conversion process but also extends the lifespan of the device by maintaining optimal operating conditions at all times.

In some instances, the device 100 includes a converter 106, such as an electric generator or a similar device, that converts the kinetic energy from vehicular motion into electrical energy. While discussed in greater detail below, the device includes hydraulic elements (plates) that are compressed by the relative motion of the vehicle, causing fluid transfer that can be captured by the converter and transformed into electrical energy. Thus, the weight of the vehicle causes hydraulic displacement of a fluid, which operates the converter 106 to produce electrical energy.

The converter 106 can be coupled to energy storage 108, such as a battery or a load for immediate local use, providing power to streetlights, traffic signals, and other infrastructure elements directly. Alternatively, the converter 106 can be connected, either directly or indirectly, to the grid infrastructure 110. This connection allows the device 100 to feed captured energy back into the grid infrastructure 110, particularly during peak hours when the demand and cost for electricity are high, resulting in compensation at premium rates.

Furthermore, the server 112 can control the distribution of the captured energy. The server 112 can determine whether to store the energy in the battery 108 or feed the energy into the grid infrastructure 110 based on real-time monitoring of electricity prices and demand. During times of high electricity demand and cost, the server can direct the stored energy from the battery 108 back into the grid infrastructure 110, maximizing economic benefits. This intelligent control system ensures efficient energy management, optimizing both local usage and grid contributions.

In some embodiments, the device can electrically couple with and direct the generated electrical energy into an electrical meter of a local business or government agency. By integrating the device into high-traffic areas, such as roadways or parking lots, the kinetic energy captured from moving vehicles can be efficiently converted into electrical energy and then fed directly into the electrical infrastructure of nearby buildings. This approach not only provides a sustainable and renewable energy source for the local infrastructure but also reduces dependency on the main power grid, potentially lowering electricity costs for businesses or government agencies. Additionally, this configuration can facilitate real-time monitoring and management of energy consumption, further optimizing energy usage and efficiency.

Figure 2:
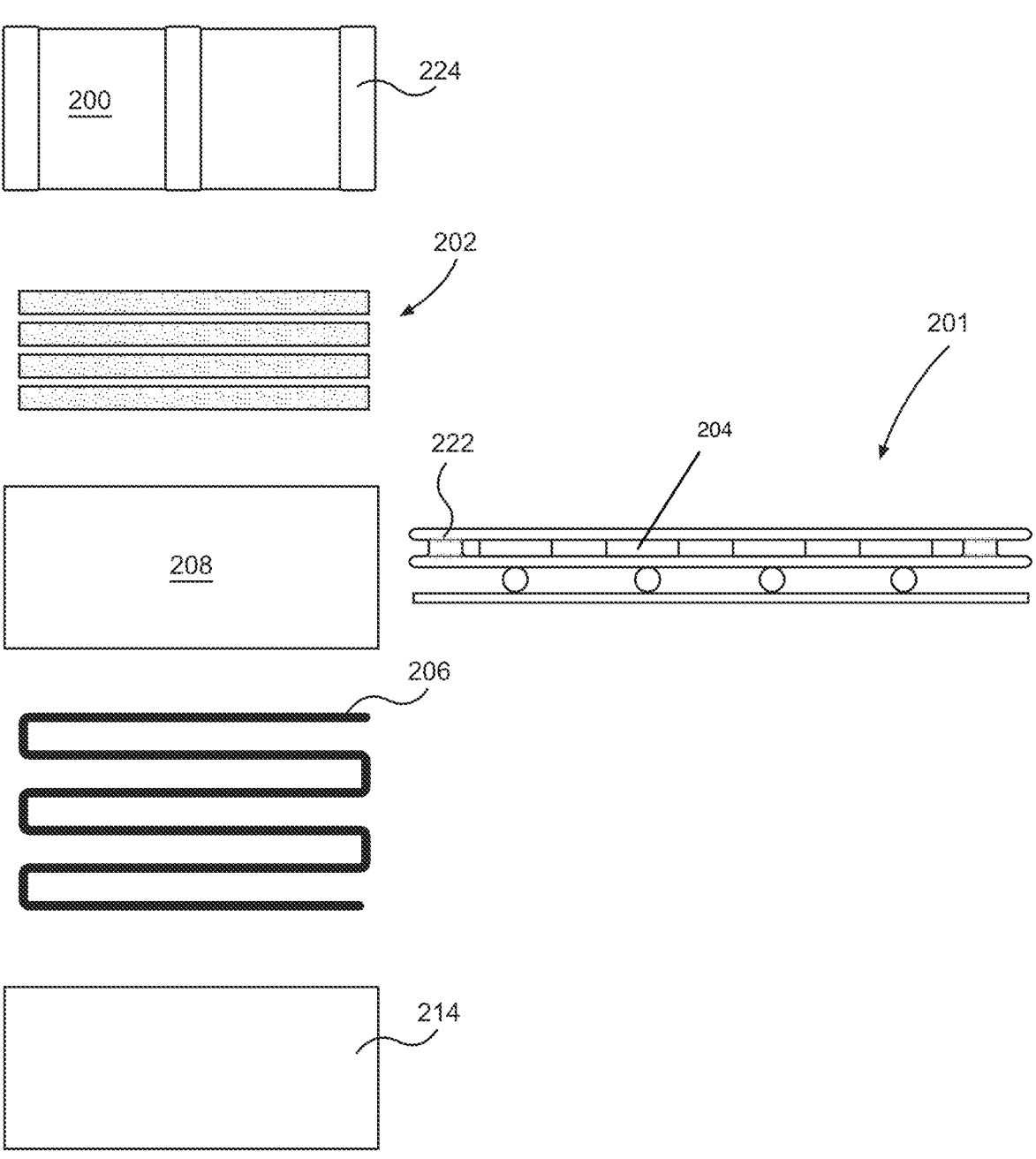
FIG. 2 is an exploded view of the device, illustrating the various substrates that comprise the device.
Figure 3:
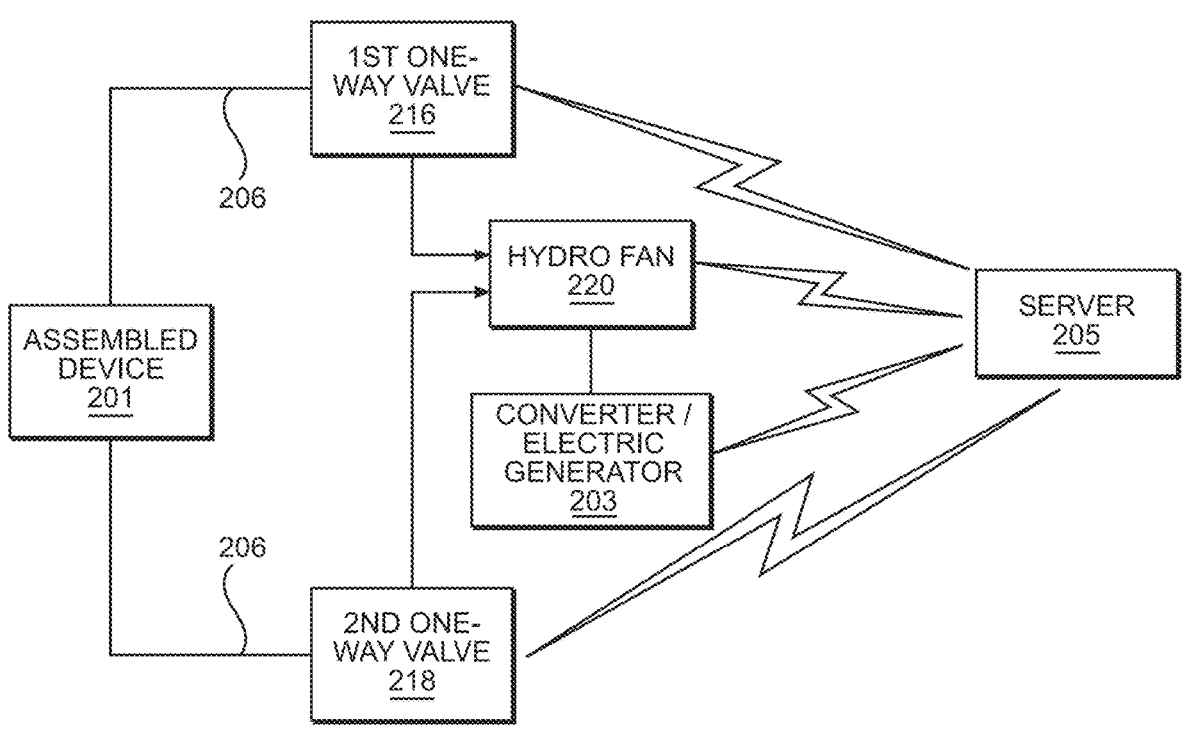
FIG. 3 is a schematic diagram of a system that incorporates the device of FIG. 2.

FIG. 2 is an exploded view of the substrates used to create a device. FIG. 3 is a schematic diagram of a system that incorporates the assembled device 201 of FIG. 2. The following description will reference both FIGS. 2 and 3 collectively. The first substrate 200 serves as the top layer of the device and is designed to provide a durable and stable surface for contact with external forces such as vehicle wheels. This first substrate 200 could be made from high-strength materials like reinforced rubber or composite polymers to withstand the repeated stress and impact from vehicular traffic.

Directly beneath the first substrate is the second substrate 202 which is covered by the first substrate. The second substrate 202 includes a series of semi-rigid plates 204 strategically spaced apart from one another. These plates 204 are semi-rigid to allow for slight movement and flexion as external forces are applied. The plates 204 could be constructed from materials such as high-density polyethylene (HDPE) or a resilient metal alloy like aluminum to balance flexibility and strength. This design ensures that when a vehicle wheel or another source of kinetic energy makes contact, the plates 204 can depress slightly, transferring the kinetic energy to the underlying structures, such as a hose.

Each of the semi-rigid plates 204 is crucial for the device's functionality. The spacing between adjacent plates 204 allows for the necessary movement and prevents the plates from interfering with each other's motion. This arrangement ensures that the kinetic energy is effectively captured and transmitted to the next layer. Positioned directly beneath the second substrate 202 and its semi-rigid plates 204 is a hose 206 arranged in a serpentine configuration. The hose 206 is filled with fluid and aligned directly under each plate 204, ensuring that as each plate is depressed, the hose 206 creates a localized increase in pressure within the hose 206. The hose 206 could be made from durable, flexible materials such as reinforced rubber or silicone to handle the pressure changes and maintain integrity over prolonged use. Additionally, thermoplastic elastomers (TPE) can be used, offering a balance of flexibility, strength, and chemical resistance.

To ensure the system operates efficiently in high or low temperatures, fluid additives can be incorporated into the fluid within the hose. These additives would modify the fluid properties to prevent freezing in low temperatures and reduce thermal expansion in high temperatures, thereby maintaining optimal fluid dynamics and system performance under varying environmental conditions. Sensors can be placed throughout the fluid loop of the hose and sense the temperature of the fluid with the hose at various locations.

As the vehicle contacts the plates, the transferred pressure forces the fluid to move in a controlled, one-way direction towards a converter 203 which is responsible for transforming the kinetic energy into electrical energy. After compression, the hose 206 can expand back to an original size due to the resilient nature of the material used to manufacture the hose 206. In some instances, springs or other resiliently biased members 222 can be placed between adjacent plates. These resilient members would push upwards on the first substrate 200, causing the plates of the second substrate to be elevated back to their original positions.

The exploded view in FIG. 2 also shows the third substrate 208 situated below the hose 206. The third substrate 208 provides structural support for the entire assembly, ensuring stability and durability. The third substrate 208 could be made from sturdy materials like steel or reinforced concrete to provide a strong foundation. Additionally, there is a fourth substrate 214 which can be placed between the second substrate 202 and the hose 206, adding an extra layer of support and helping to maintain the alignment and integrity of the components above. The fourth substrate 214 could be constructed from high-strength plastic or composite materials that offer support without adding excessive weight.

To ensure a robust and durable assembly, the layers can be joined using various manufacturing techniques. One effective method is sonic welding, which uses high-frequency ultrasonic acoustic vibrations to create solid-state welds between the materials. This technique is particularly useful for joining plastic components, ensuring a strong bond without the need for adhesives or additional fasteners. Other potential manufacturing methods include adhesive bonding, where specialized industrial adhesives create a strong and flexible bond between layers, and mechanical fastening, which might involve screws, bolts, or rivets to securely attach the different substrates and components. These manufacturing techniques contribute to the overall durability and longevity of the device, ensuring that it can withstand the stresses and demands of regular use in various environments. Regardless of the method used to join the substrates, an assembled device 201 is shown in FIG. 2.

In another embodiment, metal rails 224 can be installed on the sides and middle of the device to guide a snow plow over the device without causing damage. These rails would be strategically positioned to protect the plates and hoses from the impact and scraping of the snow plow. FIG. 2 depicts this embodiment, showing the placement of metal rails to safeguard the device during snow removal operations. These metal rails can be added to any embodiment.

To ensure efficient and controlled fluid flow, the device incorporates one-way valves positioned before and after the converter or electric generator 203. A first one-way valve 216 is located before the converter 106 to allow fluid to enter the converter/generator 203, and another, second one-way valve 218 is positioned after the converter 106 to enable the fluid to exit. These valves ensure that the fluid flows in only one direction across the converter/generator 203, preventing any backflow that could disrupt the energy conversion process. By maintaining a consistent and directed flow of fluid through the converter/generator 203, the one-way valves 216 and 218 optimize the efficiency of the kinetic-to-electrical energy transformation, ensuring that the system operates effectively and reliably. In some instances, one-way valves can be placed before and after each of the plates. In another example, a single one-way valve is positioned before the first plate and another one-way valve after the last plate. These valves ensure that the fluid flows only in the intended direction, preventing any potential backflow and enhancing the overall energy transfer efficiency.

In some instances, a hydro fan 220 is integrated in-line with the hose 206, allowing the fluid within the hose 206 to drive the hydro fan 220. As the fluid flows through the hose 206, the fluid impinges on the blades of the hydro fan 220, causing the hydro fan 220 to rotate. This rotational motion is then transferred to the converter 106, which in this configuration, is an electric generator. The rotation of the hydro fan 220 effectively turns the electric generator, converting the kinetic energy of the fluid flow into electrical energy. The use of a hydro fan 220 enhances the efficiency of the energy conversion process by maximizing the mechanical energy transferred from the fluid to the electric generator, thereby optimizing the overall performance of the device. This configuration ensures a steady and reliable production of electricity as the fluid continuously drives the hydro fan 220 within the hose 206 as vehicles pass over the device 201.

It will be understood that the fan blades of the hydro fan 220 can be configured to turn based on fluid flow in a single direction, however, in some instances, the hydro fan 220 has blades that allow the shaft connected to the converter to turn in two directions to generate electrical power. A server 205 can be equipped with a switch or similar mechanism to manage fluid flow from two different directions. This switch can be placed before the converter 106 to selectively direct fluid flow from either direction. By doing so, the server can ensure optimal energy capture and conversion regardless of the direction of vehicle movement. The switch is controlled by the server 205, which monitors real-time data from sensors measuring fluid flow and pressure within hoses. Based on this data, the server dynamically adjusts the switch to accept fluid flow from the direction with the highest pressure or flow rate, thereby maximizing the efficiency of the energy conversion process. This ability to control fluid flow from multiple directions enhances the system's versatility and ensures consistent electrical power generation under varying traffic conditions.

The device could be designed as a single pad made from rubber mold injection. This pad would integrate both the semi-rigid plates and the hose or fluid channels within the pad itself, providing a seamless and robust structure.

Figure 4:
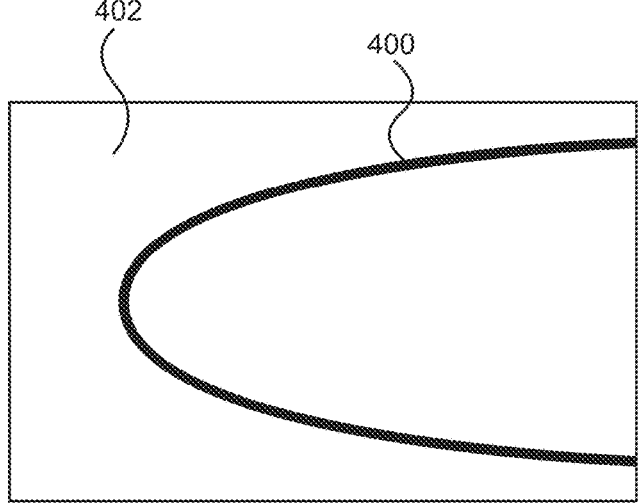
FIG. 4 is a schematic view of another hose configuration and orientation.

As noted above, in some embodiments, the hose can be oriented in a serpentine configuration. In other embodiments, the hose 400 is arranged in a parabolic configuration, as shown in FIG. 4 above or below a substrate 402. This parabolic configuration can be substituted for the serpentine configuration in certain devices, offering an alternative layout for the fluid flow path. Similar to the serpentine arrangement, the parabolic hose configuration can be connected to a converter and one-way valves and to ensure a consistent, unidirectional flow of fluid. This design maintains the efficiency of the energy conversion process by directing the fluid through the converter in a controlled manner, thereby optimizing the device's ability to capture and convert kinetic energy into electrical energy.

Figure 5:
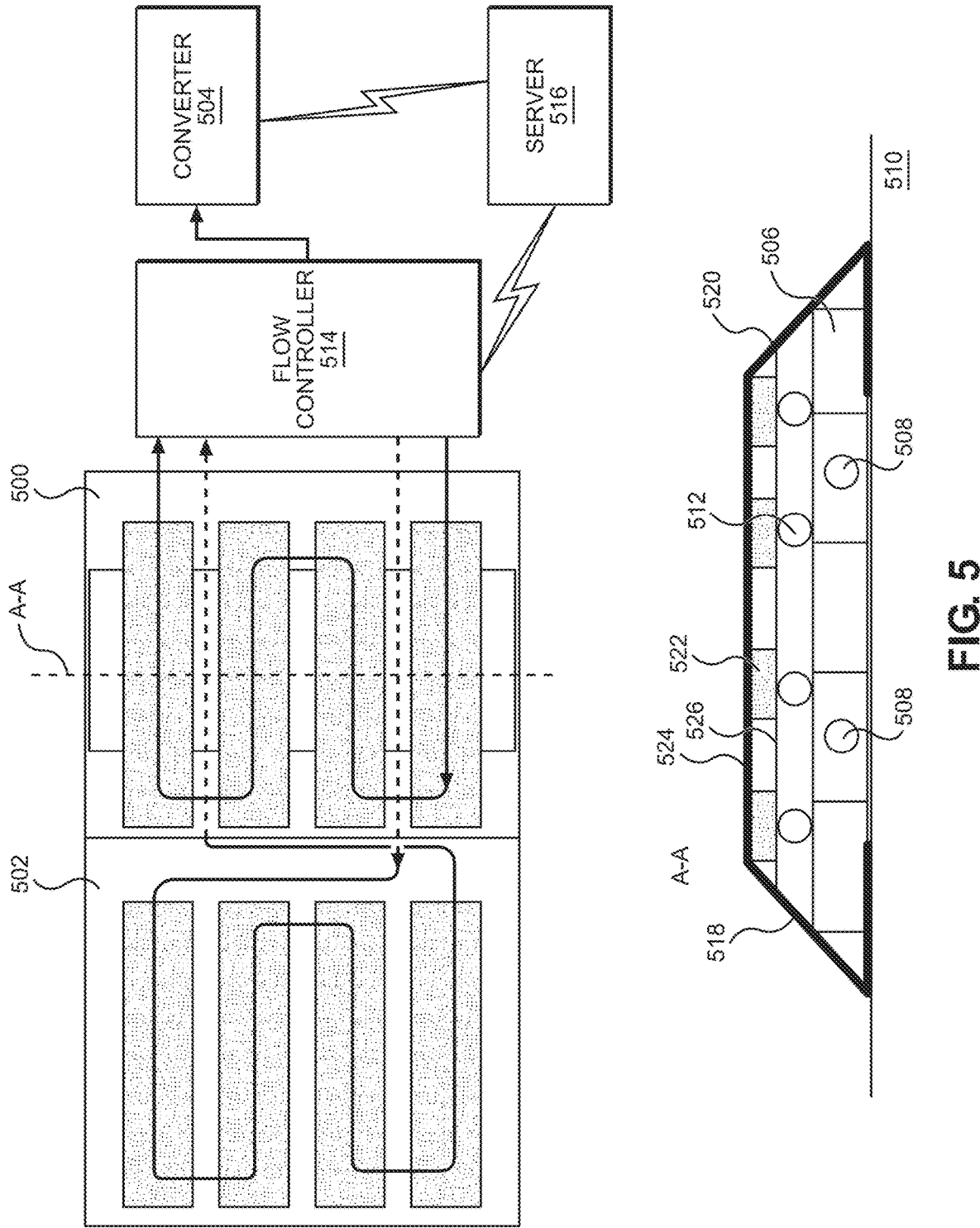
FIG. 5 is a top plan view of two devices and arranged side by side.
Figure 6:
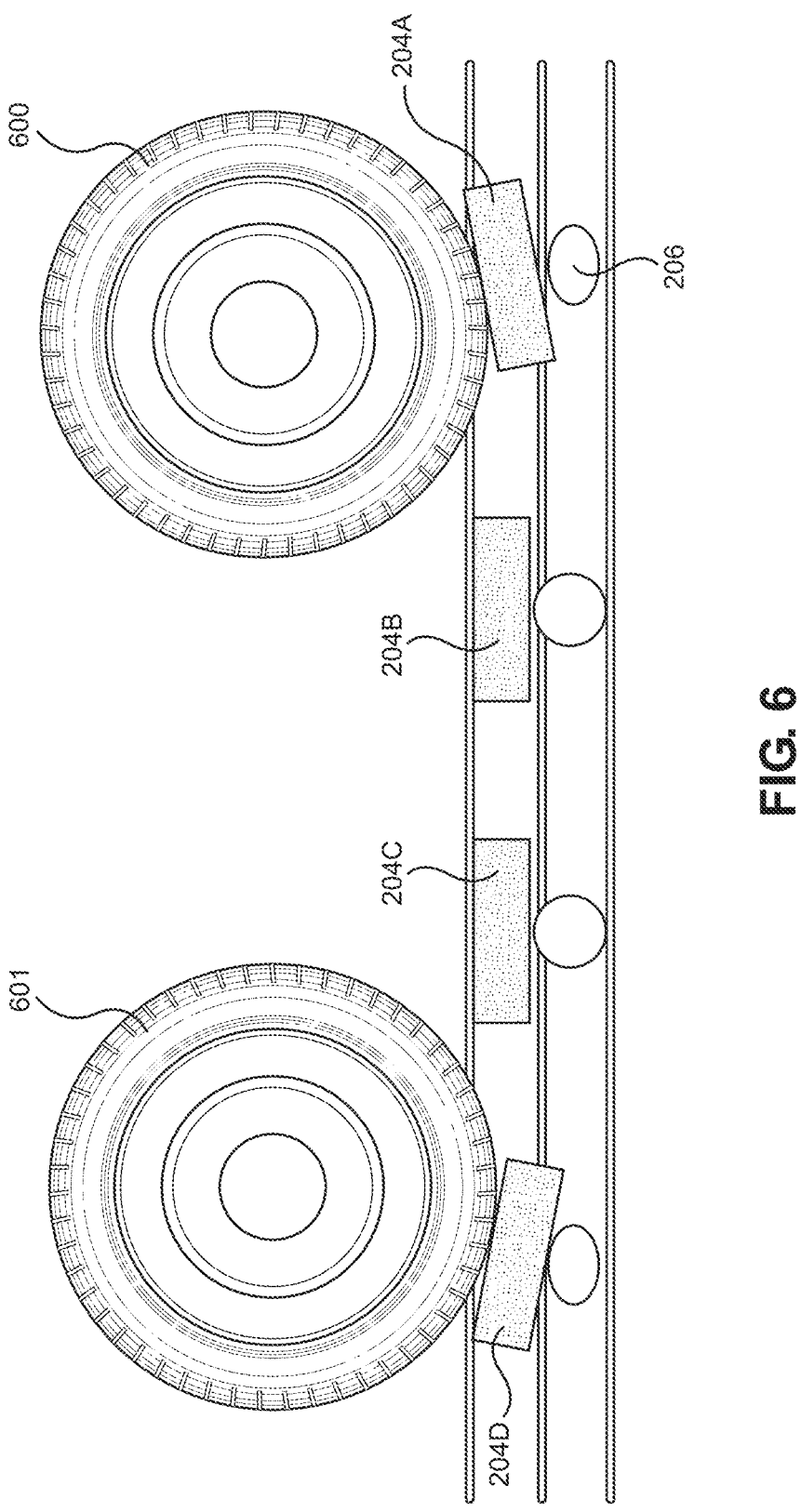
FIG. 6 is a diagrammatic view of wheels of a vehicle interacting with the plates of a device of the present disclosure.

FIG. 5 is a top plan view of two devices 500 and 502 arranged side by side. In this configuration, device 500 captures energy from vehicles moving in one direction, while device 502 captures energy from vehicles moving in the opposite direction. To facilitate the use of a single converter 504, device 500 is mounted on a partially hollow device frame 506. This design allows the hose 508 of device 502 to pass underneath device 500 and connect to the converter 504. As best shown in section A-A, the device frame 506 can be constructed from a metal frame or grid that supports device 500 above a subordinate surface 510, such as a road. Proper orientation of the hose 508 of device 502 ensures that the fluid flow in hose 508 is unidirectional and consistent with the flow in hose 512 of device 500.

To address concerns of excess pressure that may arise from vehicles moving over both devices 500 and 502 simultaneously, a flow controller 514 can be optionally integrated into the system. The flow controller 514 is positioned before the converter 504 and is controlled by a server 516. The server 516 monitors real-time data from sensors measuring fluid flow and pressure within hoses 508 and 512. When both devices 500 and 502 experience simultaneous vehicle pressure, the server 516 dynamically adjusts the flow controller 514 to regulate the fluid pressure, preventing any potential overpressure conditions that could damage the converter 504 or reduce system efficiency.

As with other embodiments, one-way valves can be incorporated into the system to facilitate the direction of flow shown by the arrows in FIG. 5. It will be understood that each device 500 and 502 can be connected to a discrete converter rather than a single converter. These converters can be co-located on the same side of a roadway as one another.

In some embodiments, to accommodate the extra height of the device frame 506, a device, such as device 500 can include end cap ramps 518 and 520. The end cap ramp 518 provides an angled surface that a vehicle can drive upon in order to interact with plates, such as plate 522 of device 500. The end cap ramps 518 and 520 can also function to capture the terminal ends of the substrate layers used to create the device 500. For example, substrate layers 524 and 526 are covered and can be coupled with the end cap ramps 518 and 520.

Devices and Systems in Use

Referring now to FIGS. 1-6 collectively, as a vehicle moves over the device, the interaction between the wheels 600 and 610 and the sequentially arranged plates generates a one-way fluid flow through the system (see plates 204A-204D). Each plate 204 is strategically positioned over a fluid-filled hose 206 and is designed with a semi-rigid structure to facilitate movement. As the vehicle's wheels come into contact with each plate 204, the force of the impact depresses the hose 206 directly beneath the plate. For example, wheel 600 compresses plate 204A, and wheel 601 compresses plate 204B.

When the hose 206 is depressed, the fluid within the hose 206 is displaced, creating a localized increase in pressure at the point of contact. This pressure forces the fluid to move in one direction through the hose 206, maintaining a consistent and directed flow of fluid. As the vehicle continues to move, each subsequent plate 204 is sequentially depressed by the wheels, continuing the movement of the fluid. The fluid displacement from each plate 204A-204D combines to create a continuous and coordinated flow through the hose 206.

This one-way fluid flow ensures that the kinetic energy imparted by the vehicle is effectively transmitted along the length of the hose 206 towards the converter 203 (see FIG. 3). The converter 203, which can be an electric generator or other similar device, receives the fluid and uses its pressure and movement to generate electrical energy. The continuous and one-way nature of the fluid flow maximizes the efficiency of energy transfer, minimizing losses and ensuring a steady supply of kinetic energy to be converted into electrical power. This fluid dynamic system not only captures the energy from the vehicle's movement but also optimizes its conversion into useful electrical energy, which can be used locally or fed back into the grid during peak demand times for optimal economic benefits.

When a vehicle drives over the device, the interaction between the wheels and the sequentially arranged plates 204A-204D generates a unique "wave motion." Each plate 204A-204D is strategically positioned over a fluid-filled hose 206 and designed with a semi-rigid structure to facilitate movement. As the vehicle's wheels come into contact with each plate, the force of the impact causes a plate to rock slightly. This rocking motion, combined with the pressure applied by the vehicle, depresses the hose 206 directly beneath the plate. For example, wheel 600 causes plate 204A to rock as it rolls onto plate 204A and wheel 601 causes plate 204D to rock as it rolls off of plate 204D.

The depression of the hose 206 displaces the fluid within the hose 206, creating a localized increase in pressure. As the vehicle progresses, the subsequent plates 204A-204D experience the same depressing actions. This sequential depression of the plates 204A-204D generates a fluid displacement that propagates through the hose 206 in a ripple or wave-like manner, similar to the effect observed when a wave travels across the surface of water.

This wave motion is not merely a series of independent actions but a continuous and coordinated flow of energy. The fluid in the hose 206 moves in a wave-like pattern, effectively transmitting the kinetic energy imparted by the vehicle's movement along the length of the hose 206. This continuous propagation of energy ensures a steady and efficient transfer of kinetic energy towards the converter.

The wave motion enhances the efficiency of the energy conversion process. By maintaining a consistent flow of fluid, the system minimizes energy losses and maximizes the amount of kinetic energy converted into electrical energy. This dynamic interaction between the plates 204A-204D and the hose 206 allows the device to capture energy from each wheel movement effectively. The resulting electrical energy can then be used locally to power infrastructure elements such as streetlights and traffic signals or be fed back into the grid, particularly during peak times when electricity demand and prices are high. This intelligent design and operation make the device an innovative solution for harnessing renewable energy from everyday vehicular motion, contributing to more sustainable and energy-efficient urban environments.

The dimensions of the device are carefully designed to optimize the interaction between the semi-rigid plates and the fluid-filled hose, ensuring efficient energy capture and conversion. The size and spacing of the plates within the device are tailored to match the average wheelbase of vehicles expected to drive over the device. This alignment maximizes the wave-like interaction and fluid flow, thereby enhancing the overall performance of the system.

Each semi-rigid plate 204 is strategically positioned to correspond with the typical distance between the front and rear wheels of a vehicle. The average wheelbase for most passenger vehicles ranges from approximately 2.5 meters to 3 meters (98 to 118 inches). To accommodate this, the plates are spaced apart accordingly, ensuring that as the front wheels of a vehicle depress the initial plates, the rear wheels will sequentially engage with the subsequent plates. This sequential engagement creates a continuous and coordinated wave motion in the fluid-filled hose 206, optimizing the displacement and energy transfer process.

In some embodiments, each plate is around four to twenty inches wide (lateral dimension), and in some instances, the dimensions are preferable between six and twelve inches, allowing for adequate surface area to capture the kinetic energy from the vehicle's wheels. The longitudinal dimension (length) can vary to enhance the wave type motion disclosed herein. The thickness of the plates is designed to be sufficient to provide the necessary rigidity while allowing for slight flexion. This balance ensures that the plates can effectively transfer the kinetic energy to the hose 206 without compromising durability.

The overall width of the device is designed to cover the span between the front and rear wheelbases of a vehicle, typically around 2.1 to 2.4 meters (7 to 8 feet). This ensures that both the front and rear wheels of a vehicle interact with multiple plates as the vehicle drives over the device. The total length of the device is generally around 3 to 4 meters (10 to 13 feet), covering the entire width of a traffic lane and ensuring that all wheels of a vehicle can engage with the plates.

Spacing between the plates is another factor. The gaps between adjacent plates are maintained at around 0.25 inches to 3 inches. This spacing is sufficient to allow for the necessary movement and flexion of each plate while ensuring that the kinetic energy is effectively transferred to the hose 206 underlying the plates.

By aligning the dimensions of the device with the typical wheelbase and vehicle dimensions, the design ensures that the wave-type interaction and fluid flow are maximized. This strategic alignment not only enhances the efficiency of energy capture and conversion but also ensures that the device can handle a wide range of vehicle sizes and types, from passenger cars to light trucks. This thoughtful consideration of dimensions and spacing underscores the device's adaptability and effectiveness in real-world applications.

Figure 7:
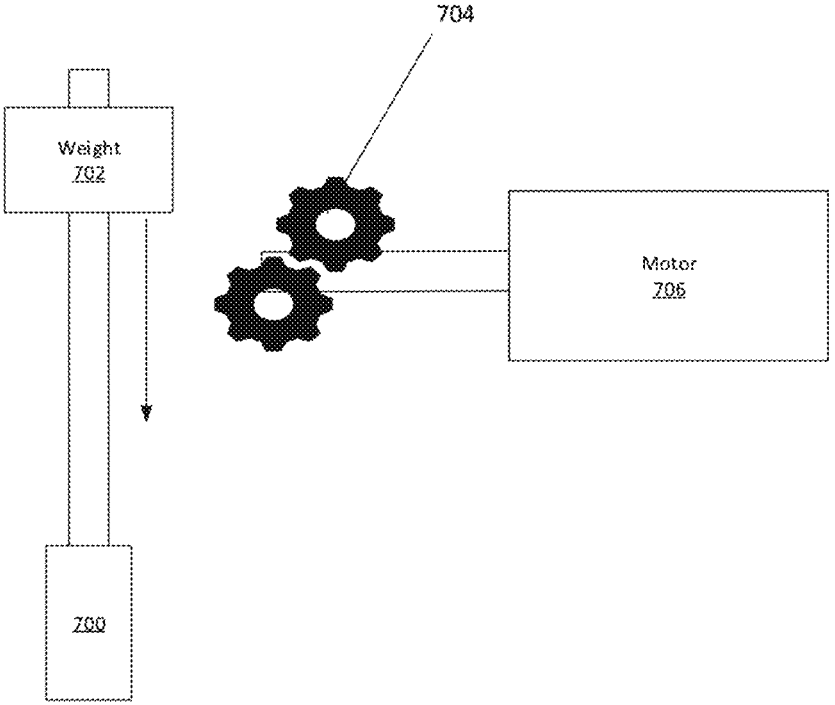
FIG. 7 is an alternate energy capture device that can be used with a device or system of the present disclosure.

FIG. 7 illustrates another hydraulic energy recovery system designed to convert kinetic energy into electrical energy through a series of mechanical interactions. The system comprises a piston 700, a weight 702, and a gear assembly 704 coupled to the weight 702. This arrangement leverages fluid dynamics and gravitational force to generate electricity efficiently.

The fluid within the system drives the piston 700, causing it to move upward. This upward movement of the piston 700, in turn, lifts the weight 702. The weight 702 is strategically selected to provide significant gravitational force, which is a crucial aspect of the system's energy conversion efficiency. As the piston 700 raises the weight 702, potential energy is stored in the elevated position of the weight.

Once the weight 702 reaches its peak, gravity takes over, exerting a downward force on the weight. This gravitational pull causes the weight 702 to descend, thereby engaging the gear assembly 704. The descent of the weight 702 rotates the gear assembly 704, converting the potential energy stored in the elevated weight into mechanical energy. The gear assembly 704 is meticulously designed to maximize the conversion of the weight's potential energy into rotational motion.

The rotational motion of the gear assembly 704 is then transferred to a motor 706, which produces electrical energy. This motor can be an electric generator specifically designed to convert mechanical energy into electrical power efficiently. The generated electrical energy can be harnessed for various applications, such as powering infrastructure elements, charging batteries, or feeding into the electrical grid.

Figure 8:
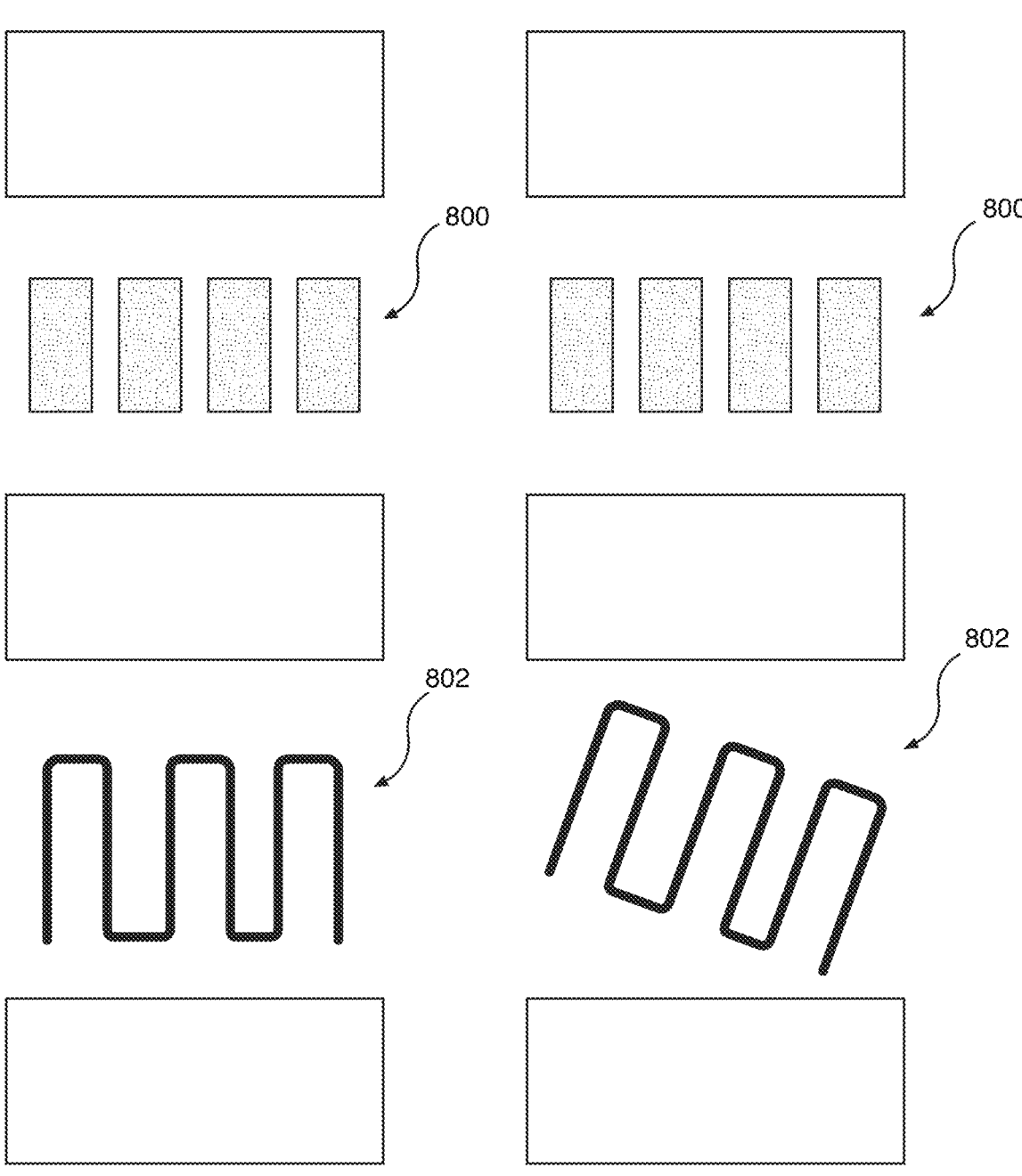
FIG. 8 is another alternate energy capture device that can be used with a device or system of the present disclosure.

FIG. 8 illustrates an exploded view of another example apparatus or device that includes plates 800 that run orthogonally relative to the embodiments above. The hose 802 is oriented in the same direction as the plates. It will be understood that the plates and hose need not run in the same direction. Other plate and hose orientations can include where the plates extend in the horizontal or vertical direction, while the hose is in a serpentine arrangement or in a parabolic arc. Another example includes plates that are placed at a diagonal orientation with the hose in a serpentine arrangement or in a parabolic arc. In yet another embodiment, each plate can be associated with a unique hose. The hose can be in a serpentine, parabolic, or angle orientation relative to the plate.

In an embodiment where the hoses run perpendicular to the plates, multiple hoses can be used to ensure a similar volume of fluid flow as the traditional serpentine hoses. Each hose connects to a separate hydro generator, and all hydro generators are then connected to a single inverter (converter).

Another embodiment includes a configuration where there are separate pads for each tire of the vehicle. Each pad measures approximately 6 feet wide by 7 feet deep, allowing for one pad to be positioned under the left tires and another under the right tires of the vehicle.

Figure 9:
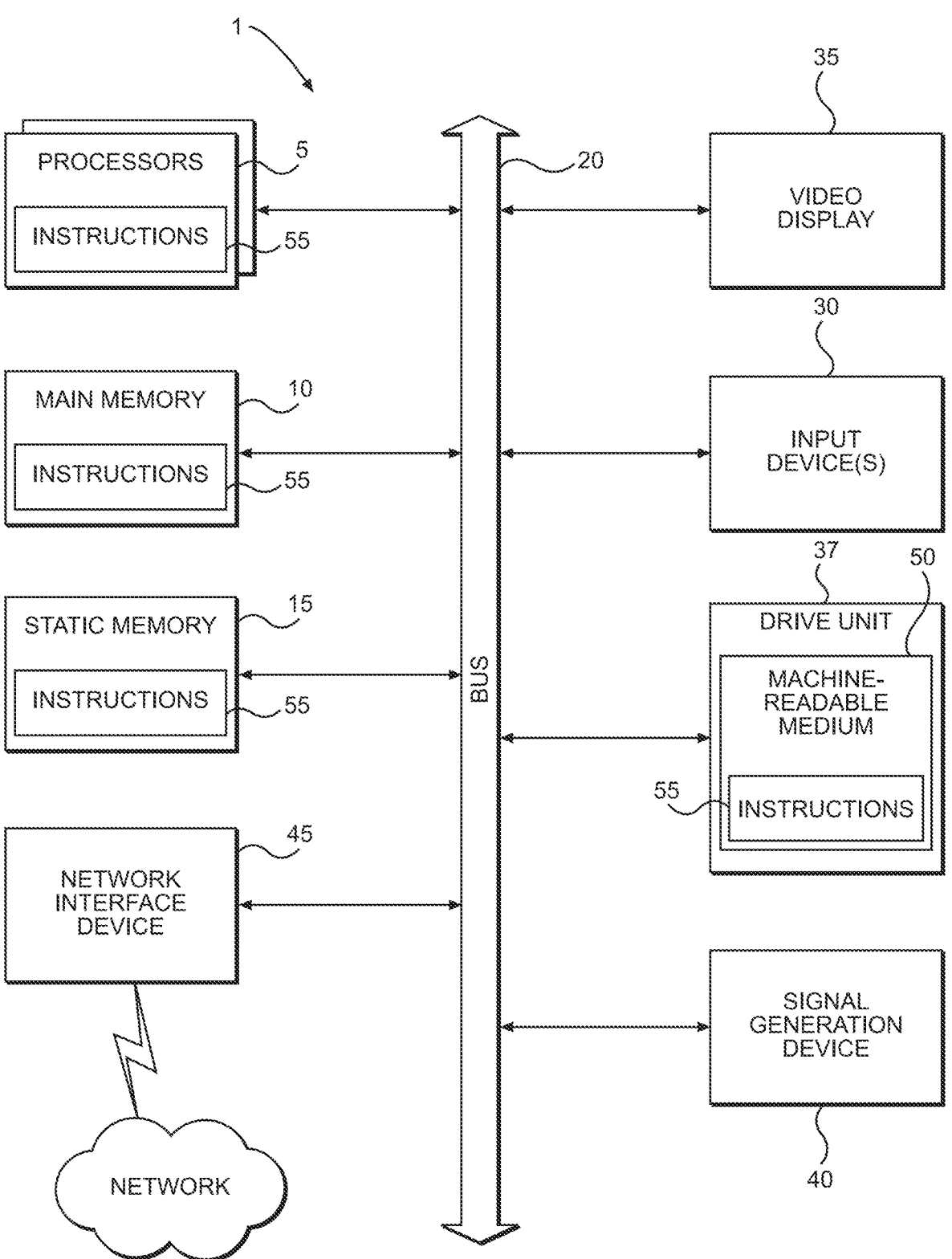
FIG. 9 is a representation of an example machine in the form of a computer system.

FIG. 9 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A device for capturing and converting kinetic energy into electrical energy, the device comprising:
a first substrate;
a second substrate that is covered by the first substrate, the second substrate comprising a plurality of plates, wherein adjacent ones of the plurality of plates are spaced apart from one another, each plate of the plurality of plates being semi-rigid;
a hose positioned below the second substrate in a serpentine configuration comprising a plurality of U-shaped bends such that the hose traverses back and forth directly underneath each of the plurality of plates, the hose being filled with a fluid; and
a third substrate located below the hose.

2. The device according to claim 1, further comprising a hydroelectric generator that is in closed-loop fluid communication with the hose, the hydroelectric generator being configured to create electrical energy as the hose is depressed by the plurality of plates causing the fluid to interact with the hydroelectric generator.

3. The device according to claim 2, further comprising a storage device or a load for receiving the electrical energy.

4. The device according to claim 2, wherein the hydroelectric generator comprises a turbine and an electric generator, and wherein the fluid is configured to rotate the turbine which drives the electric generator to produce the electrical energy.

5. The device according to claim 1, further comprising a fourth substrate located between the second substrate and the hose, wherein the fourth substrate is positioned above the hose.

6. The device according to claim 1, further comprising a first one-way valve positioned in the hose before a first plate of the plurality of plates.

7. The device according to claim 6, further comprising a second one-way valve located after a last plate of the plurality of plates.

8. The device according to claim 1, further comprising rails disposed on the first substrate to protect the plurality of plates and prevent a plow from contacting the plurality of plates.

9. A method, comprising:
providing a device comprising:
a first substrate;
a second substrate covered by the first substrate, the second substrate comprising primary plates that are spaced apart and semi-rigid;
a hose positioned below the second substrate in a serpentine configuration, directly underneath each of the primary plates, the hose being filled with a fluid;
a hydroelectric generator comprising a turbine and an electric generator, the hydroelectric generator in closed-loop fluid communication with the hose, configured to create electrical energy as the hose is depressed by the primary plates causing the fluid to rotate the turbine which drives the electric generator;
a load for receiving the electrical energy; and
permitting a vehicle to drive over the device, where wheels of the vehicle contact and depress the primary plates in series, wherein a first primary plate is depressed before a last primary plate by the vehicle so that the fluid in the hose is sequentially propagated through the hose towards the hydroelectric generator, thereby providing continuous flow of the fluid to the hydroelectric generator as the vehicle traverses over the primary plates.

10. The method according to claim 9, further comprising providing another substrate between the second substrate and the hose, installing a one-way valve before and after each primary plate, and rotating a shaft with the fluid to cause an electric motor to produce the electrical energy.

11. A system for capturing and converting kinetic energy into electrical energy, the system comprising:
a first device comprising:
a first substrate;
a second substrate that is covered by the first substrate, the second substrate comprising plates, wherein adjacent ones of the plates are spaced apart from one another, the plates each being semi-rigid;

a hose positioned below the second substrate in a serpentine configuration comprising a plurality of U-shaped bends such that the hose traverses back and forth directly underneath each of the plates, the hose being filled with a fluid;

a third substrate located below the hose;

a converter that is in closed-loop fluid communication with the hose, the converter being configured to create electrical energy as the hose is depressed by the plates causing the fluid to interact with the converter;

a storage device for receiving the electrical energy; and a first device support frame configured to support the first device above a subordinate surface; and a second device configured identically to the first device, wherein a hose of the second device is configured to extend through the first device support frame and connect to another converter that is co-located with the converter associated with the first device.

12. The system according to claim 11, further comprising angled ramps associated with terminal edges of the first device and the first device support frame.

13. The system according to claim 11, further comprising:

a fourth substrate located between the second substrate and the hose;

a first one-way valve located before a first plate of the plates; and a second one-way valve located after a last plate of the plates.

14. The system according to claim 11, further comprising:

a hydro fan in combination with the converter;

a first one-way valve located before the hydro fan; and a second one-way valve located after the hydro fan.

15. The system according to claim 11, further comprising rails disposed on the first substrate to protect the plates and prevent a plow from contacting the plates.

16. The system according to claim 11, wherein the hose of the second device extends under plates of second device in an orientation that is perpendicular to the orientation of the hose of the first device.

17. The system according to claim 11, wherein the hose of the second device extends under plates of second device in a parabolic arc.

18. The system according to claim 11, wherein the hose of the second device extends under plates of second device at an angle relative to an angle of the plates.

* * * * *